United States Patent
Kumar

(10) Patent No.: US 7,073,007 B1
(45) Date of Patent: Jul. 4, 2006

(54) INTERRUPT EFFICIENCY ACROSS EXPANSION BUSSES

(75) Inventor: Sampath Hosahally Kumar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 352 days.

(21) Appl. No.: 10/625,218

(22) Filed: Jul. 22, 2003

(51) Int. Cl.
*G06F 9/48* (2006.01)

(52) U.S. Cl. .................... 710/268; 710/48; 710/22

(58) Field of Classification Search ............ None
See application file for complete search history.

(56) References Cited

U.S. PATENT DOCUMENTS

| | | | | |
|---|---|---|---|---|
| 5,475,854 A | * | 12/1995 | Thomsen et al. | 710/260 |
| 5,822,568 A | * | 10/1998 | Swanstrom | 710/23 |
| 5,974,478 A | * | 10/1999 | Wood et al. | 710/22 |
| 5,978,865 A | * | 11/1999 | Hansen et al. | 710/22 |
| 6,098,141 A | * | 8/2000 | Williams et al. | 710/305 |
| 6,378,023 B1 | * | 4/2002 | Christie et al. | 710/260 |
| 6,584,558 B1 | * | 6/2003 | Hammond et al. | 710/269 |
| 6,665,750 B1 | * | 12/2003 | Williams et al. | 710/48 |

* cited by examiner

*Primary Examiner*—Glenn A. Auve
(74) *Attorney, Agent, or Firm*—Marger Johnson & McCollom, P.C.

(57) ABSTRACT

A method of processing interrupts is described as well as processing devices. A processing device detects an indicator associated with an interrupt signal from an expansion device and transfers data related to the interrupt signal from the device across the expansion bus to a local memory. The device then process the data related to the interrupt.

29 Claims, 3 Drawing Sheets

INTERRUPT EFFICIENCY ACROSS EXPANSION BUSSES

BACKGROUND

In most current system architectures, a central processing unit (CPU) has input/output (I/O) devices connected to it via an I/O expansion bus, such as a Peripheral Component Interconnect (PCI) bus. When these devices have something to which they need the CPU to attend, they generate an interrupt. The interrupt causes the CPU to execute a set of code typically called an interrupt handler. The interrupt handler determines the occurrence for which the CPU is needed, clears or acknowledges the interrupt, and then returns the CPU to its usual processing.

Events that may cause an interrupt to be generated can range from normal events like completion of data transfers to or from memory to exceptional events like an error of some kind. Typically, when an event occurs these devices interrupt the CPU and then the CPU determines the occurrence by accessing an interrupt status register (ISR) across the expansion bus. This across-bus accessing can take a microsecond or more depending on the speed of the I/O expansion bus and the devices used to connect to the bus. As CPUs gain in speed, they can perform more instruction cycles per second. Wasting a microsecond in turn wastes more instruction cycles. For example, a 1000 MHz system performs $10^9$ cycles per second, so a 1 microsecond ($10^{-6}$) stall wastes 1000 ($10^3$) cycles. This type of delay begins to impact system performance.

SUMMARY

One embodiment of the invention is a method of processing interrupts. A processing device detects an indicator associated with an interrupt signal from an expansion device and transfers data related to the interrupt signal from the device across the expansion bus to a local memory. The device then processes the data related to the interrupt.

In one embodiment, the indicator of an interrupt is an interrupt signal received at a CPU.

In another embodiment, the indicator of an interrupt is an interrupt signal detected or received by a direct memory access controller.

In another embodiment, the indicator of an interrupt is an update to a descriptor memory.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
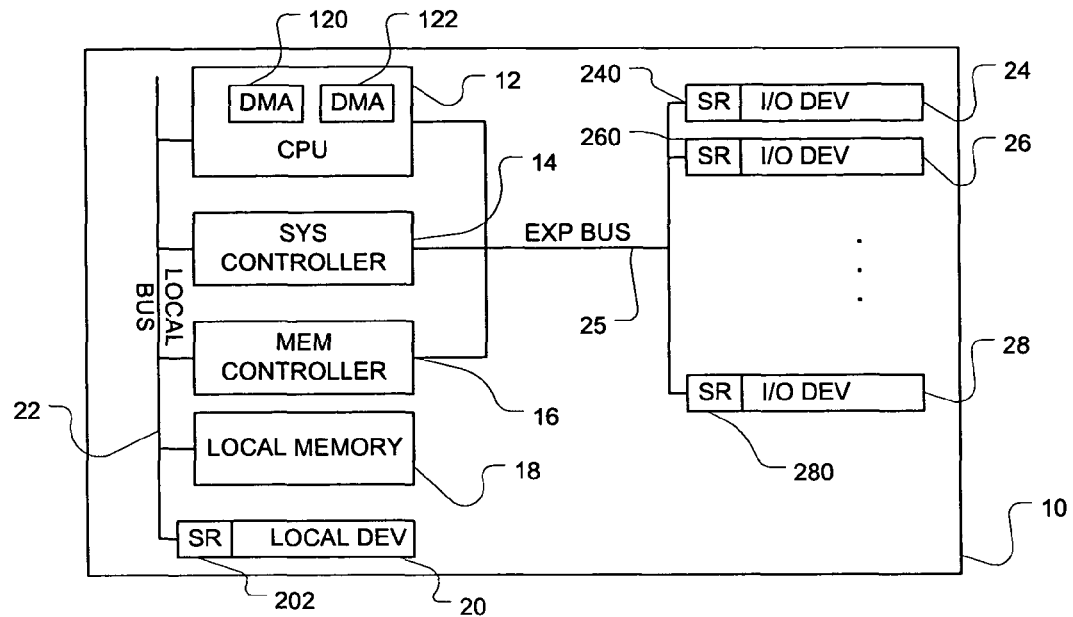
FIG. 1 is a block diagram of an embodiment of a device.

FIG. 1 shows an embodiment of a processing device 10. In this particular example, the device may sometimes be referred to as a 'system on a chip' as the device contains a central processing unit (CPU), a system controller 14, a memory controller 16, a local memory 18, and 'local' devices, such as 20. The CPU 12 may include direct memory access controllers (DMA) such as 120 and 122. A device is referred to here as a 'local' device as it is a device on the same local bus 22 as the CPU and the other components. Note that this is merely an example of a device. For example, there may be more than one CPU, several system and/or memory controllers, etc. Further, the expansion bus may actually connect to devices external to the processing device, with a portion of the expansion bus also external to device 10.

Typically, processing devices, such as computers, also have another bus, referred to here as an expansion bus. An example of such a bus would be a Peripheral Component Interface (PCI) bus. The expansion bus 25 may also be referred to as an Input/Output (I/O) bus. Devices, such as 24, 26 and 28, located across this bus may interact with the CPU in the same manner as local devices, but there is typically latency involved in bus transfers and accesses. These devices are sometimes referred to as I/O devices although some of them are not necessarily I/O related. These devices that reside across the expansion bus will be referred to here as expansion devices as the 'expand' the capabilities of the system in which they are used.

In most current systems, both local devices and expansion devices communicate with the CPU by generating an interrupt signal and transmitting it to the CPU. The CPU then accesses the interrupt status register (ISR or SR), such as 202 of device 20, and 240, 260 and 280, of devices 24, 26 and 28, respectively, of the device that generated the signal. This allows the CPU to determine the event that caused the device to send the interrupt signal. For expansion devices, this requires that the CPU access the status register and perform the read across the bus as well. This may be relatively time consuming relative to the processor's speed and therefore impacts the system's performance.

One possible approach to mitigating the CPU stall is to implement the expansion devices in local memory and local intelligence. The expansion device 'pushes' the status value into a designated register or other area of the local memory of the processor. The CPU does not have to read the status across the expansion bus, but can read the status from the local memory. This scheme can be costly, as it requires added local memory and added intelligence to perform the pushing operation.

Figure 2:
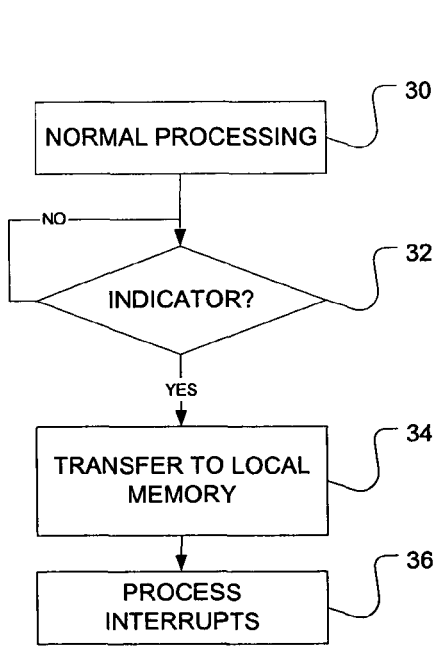
FIG. 2 is a flowchart of one embodiment of a method to process interrupts.

FIG. 2 shows a flowchart of an embodiment of handling interrupts. At 30, the CPU is performing its normal processing. At 32, when an indication of an interrupt signal, which will be explained further below, is received, the data associated with the interrupt indicator is transferred to local memory, where local memory refers to memory local to the CPU. The interrupt event is then processed at 36.

Several different terms will be used here to describe signals and events surrounding interrupt processing. An indicator of an interrupt will describe some occurrence that indicates that either an interrupt has occurred or an interrupt will occur shortly. An interrupt is the event actually notifying the CPU that some event has occurred. This notification is done by an interrupt signal, which is the actual signal generated and sent from the device. An interrupt event is the event that occurred which caused the device to generate the interrupt signal that requires the CPU to perform some type of processing or handling.

Figure 3:
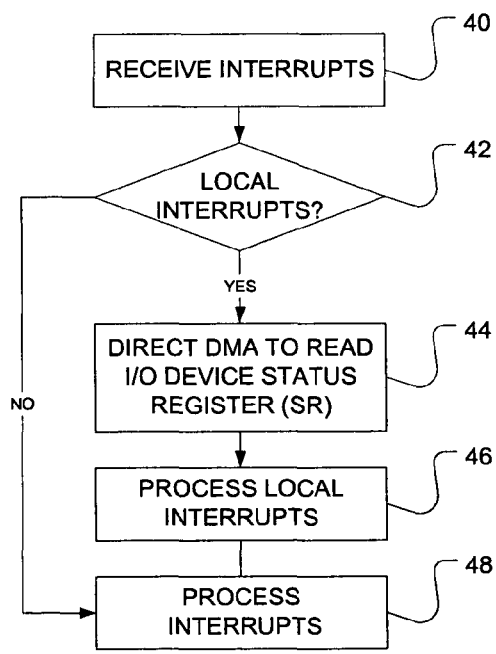
FIG. 3 is a flowchart of an alternative embodiment of a method to process interrupts.

The indicator of an interrupt, or interrupt indicator, will vary depending upon which embodiment of interrupt processing is being discussed. In one embodiment of the invention, such as that shown in FIG. 1, the CPU utilizes the DMAs to perform some handling of interrupts from devices across the expansion bus. The interrupt indicator is an interrupt signal received by the CPU. A flowchart of one embodiment of a method for processing interrupts is shown in FIG. 3. References to components of the device will also be made with regard to FIG. 1.

In FIG. 3, the interrupt signals are received at 40 by CPU 12. The CPU then determines whether or not the interrupts are from a local device, such as 20, or from a device across the expansion bus such as 24. If there are interrupts from both the local devices and the expansion devices, the CPU 12 then directs one of the DMAs, such as 120, to read the status register 240 for device 24. Meanwhile, the CPU 12 processes the local interrupt from device 20 are 46, by reading the status register 202, performing the necessary tasks needed to handle the interrupt, and then clearsinge the status register 202.

Upon completion of the local interrupts processing, the CPU then processes any interrupts from devices across the bus by accessing the status data associated with the interrupt which has been transferred by the DMA, at 46 to the local memory. The CPU then returns to normal processing until another interrupt signal is received. If interrupt signals from expansion devices are received for 40 and there are no local device interrupts at 42, the CPU may begin processing the interrupt from the expansion devices in a standard fashion at 48.

Alternatively, if more than one interrupt is received such as from device 24 and device 26, and there are no local interrupts, the CPU could begin processing the first interrupt, such as the one from 24, and direct the DMA to read the status register 260 for device 26. When the CPU has completed processing of the interrupt for 24, it could then access the data related to the interrupt from 26 from the DMA, rather than having to read it across the expansion device 26.

In this manner, the time needed by the CPU to process interrupts from devices across the expansion bus is reduced. This in turn avoids wasting CPU cycles usually lost when the CPU has to read the status registers of devices across the bus. In addition, there are no additions or changes needed to the hardware. Current devices have DMAs and local devices, either in the system controller, the CPU, or on the same device for systems on a chip.

Figure 4:
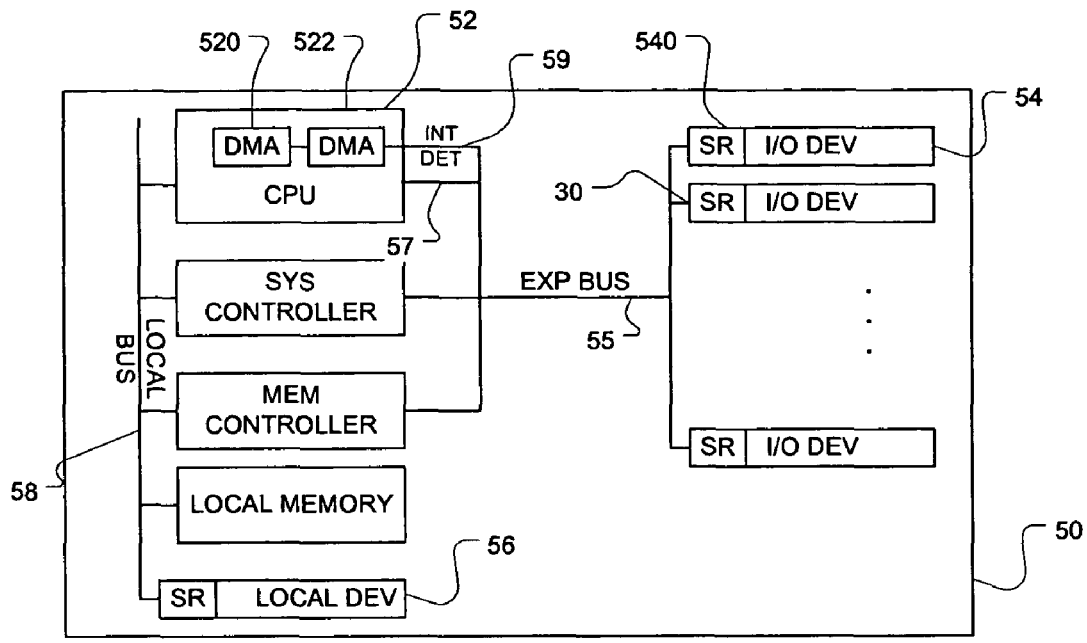
FIG. 4 is a block diagram of an alternative embodiment of a device.

In an alternative embodiment of the processing device, a minor change can be made to the architecture to allow the DMAs to process interrupts, similar to the above embodiment, with the added benefit of allowing the CPU to process all interrupts as local interrupts. An embodiment of the processing device is shown in FIG. 4.

Similar to FIG. 1, the processing device 50 includes a CPU 52, with one or more DMAs 520 and 522, at least one local device 56, connected to the CPU by local bus 58, expansion bus 55 and expansion devices such as 54. Different from current implementations of interrupt processing, however, is that the interrupt lines from the expansion bus do not connect to the CPU, but to the DMAs. The DMAs may be implemented in the CPU, the system controller or the memory controller. Typically, the interrupt signals received across the bus are directed to dedicated lines connecting to pins on the CPU. In this embodiment, these lines 57 may connect to the pins on the CPU package, but the signals are actually routed to the DMAs within the CPU.

Figure 5:
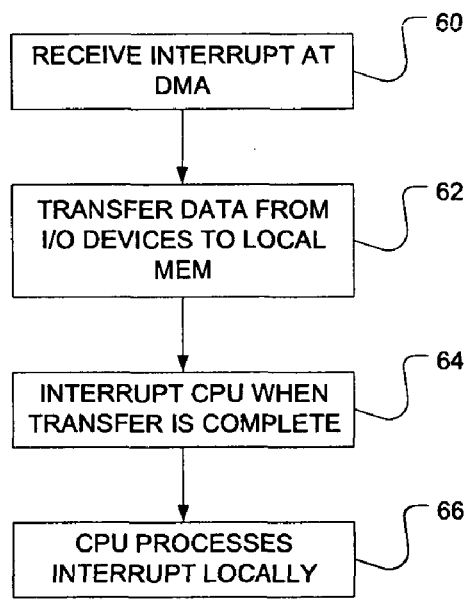
FIG. 5 is a flowchart of an alternative embodiment of a method to process interrupts.

In an alternative embodiment, the DMAs could be laid out such that they can monitor or sense signals through a detection line 59 on the central interrupt lines 57 to the CPU, and the CPU and DMAs would be programmed to proactively act prior to the interrupts being acknowledged by the CPU. In either case, the indicator of an interrupt would be the change of voltage on the interrupt lines, and the indicator would be received by the DMA directly. A flowchart of a method of processing interrupts in accordance with this embodiment is shown in FIG. 5.

The indicator of an interrupt is received at 60. The CPU does not receive the interrupt signal, so the CPU does not stall while reading the status registers across the expansion bus. The DMA handling this particular interrupt then reads the status register 540 across the expansion bus and transfers the status data to local memory at 62. As part of this process, the DMA would update a local status register. When the transfer to local memory is complete, the DMA then interrupts the CPU at 64. The CPU can then access the local memory location where the status data is stored and can process the interrupt without having to read the status register across the expansion bus at 66.

Variations within this embodiment are also possible. In some cases, for example, multiple registers from the device may need to be read. The DMA could implement chaining of multiple data transfer commands to read multiple registers sequentially from the device and store them in local memory. The DMA would then interrupt the CPU when the last transfer in the chain is complete.

A single DMA can be used to handle interrupts from multiple devices. The command chaining feature discussed above would be used for reading registers from multiple devices, rather than multiple registers on the same device. When multiple devices transmit interrupt signals simultaneously, different bits in the local status register would be set. A temporary copy of this register may be stored in the current trigger register for the DMA, which will enable one or more commands in the command chain. The DMA will then be triggered.

As the DMA executes the enabled commands determined by the trigger register, each command chain will have an interrupt enable bit that, when turned on, will set a status bit for that device in the local status register. This in turn will generate an interrupt signal to the CPU. In this manner, when commands related to a particular device are executed, the CPU can start processing the interrupt for that device while the DMA engine is reading registers for other devices concurrently. It is also possible to use multiple DMAs for multiple devices, such as one DMA for each device, or one DMA for a predetermined group of devices.

In this particular embodiment, the CPU does not receive interrupt signals until all the status and memory updates from the device are available locally. This avoids the lag in having the CPU read the expansion device status registers across the expansion bus, and also avoids having the CPU receive the interrupt and then direct the DMA to handle the interrupt.

In an alternative embodiment of the processing device, a new component, referred to here as a Memory Access Monitor (MAM) could be added to the device. The MAM may be implemented in hardware, or a piece of firmware or software operating in the system controller, the memory controller or the CPU. An example of a device including a MAM is shown in FIG. 6.

Figure 6:
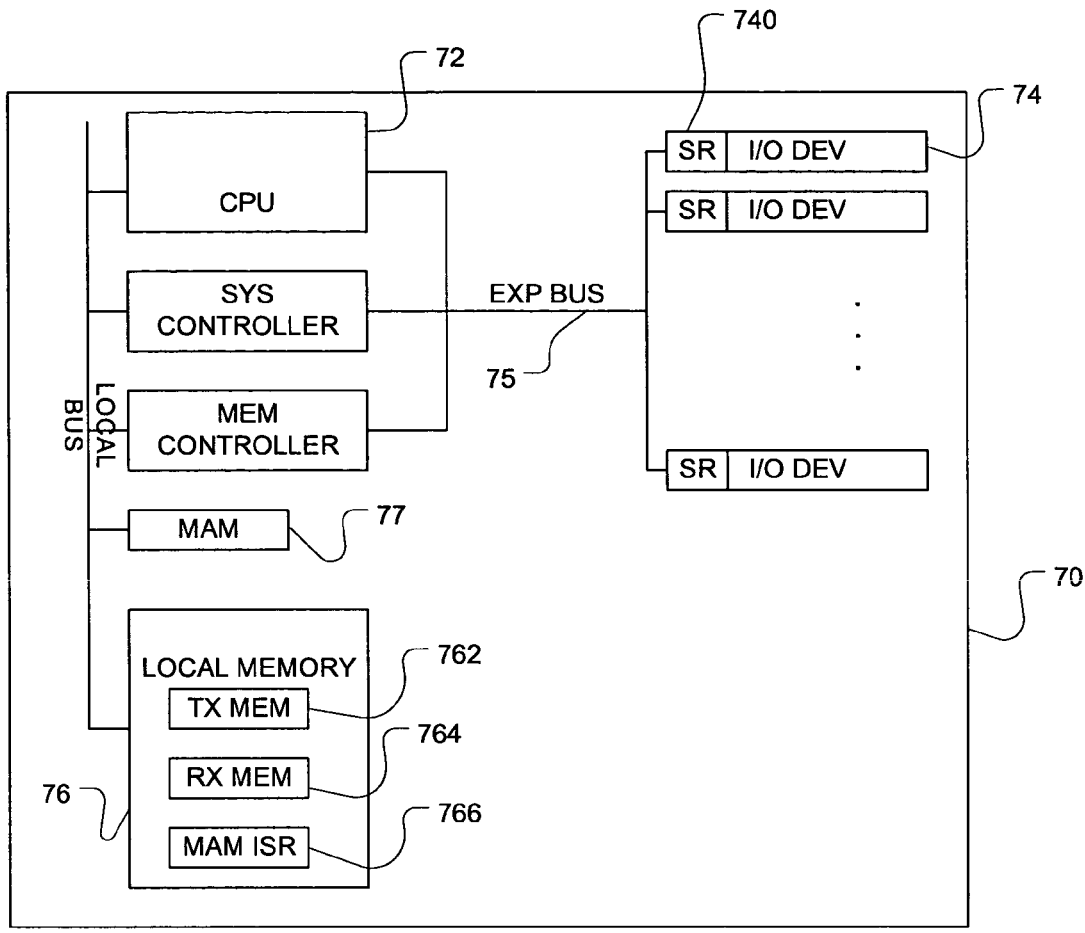
FIG. 6 is a flowchart of an alternative embodiment of a device.

In the example of the FIG. 6, the processing device 70 has a similar arrangement as those shown in the previous figures, with a CPU 72, an expansion bus 75, expansion devices such as 74, with status register 740 and a local memory 76. This is for ease of understanding the embodiments of the invention and no limitation is intended by this arrangement, as discussed above. As discussed above, interrupt signals may be transmitted by devices for routine events, such as completion of a memory transfer or a particular task that the device was performing, and for extraordinary events, such as errors.

In addition to these components, this embodiment includes a memory access monitor (MAM) 77. The local memory 76 has designated areas of memory for the receive descriptor memory 764, the transmission descriptor memory 762 and the MAM interrupt status register 766. These are used for routine memory transactions described below.

One example of a routine event for which an interrupt signal will typically be generated is when a memory transaction is completed. For example, when data is sent by some device to the local, or host, memory, an interrupt is generated to indicate this event. It is possible that the CPU will receive the interrupt before the memory transfer is actually implementations where the CPU reads the device across the expansion bus, the delay resulting in that read process generally avoids the CPU attempting to read the local memory before the transaction is completed. Therefore, for some routine interrupt events, the possibility of an interrupt reaching the CPU prior to a transfer being completed must be taken into account.

Generally, the expansion devices may use some area of the local memory for exchanging information about the normal operations with the host CPU. For example, networking devices use transmit (TX) descriptor ring/chain memory and receive (RX) ring/chain memory, set up in the memory by the CPU. The networking device reads RX descriptors to acquire pointers to free buffers for storing received packets, and then writes back to the descriptor with information about the packet. Similarly, a networking device may use the TX descriptor memory to acquire pointers to buffers containing packets to be transmitted, and then writes back these TX descriptors to indicate the completion of the packet transmission.

In this embodiment, the MAM 77 monitors the local bus accesses to specified regions of memory. The MAM will typically include multiple sets of high address and low address registers (one set for each region of memory to be monitored), and the identifier of the local bus agent, such as the identifier of the expansion bus, that is the source of the memory access. The MAM will also include the MAM ISR, typically with one bit for each of the MAM registers.

Figure 7:
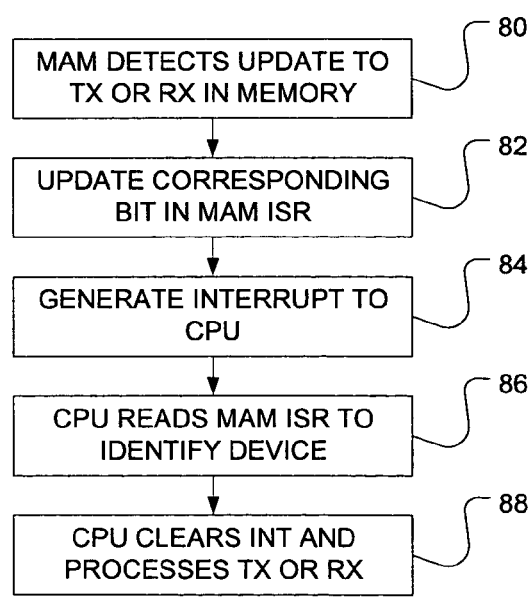
FIG. 7 is a flowchart of another alternative embodiment of a method to process interrupts.

When the driver for the device that will be using the MAM is initialized, the CPU may use some area of the designated area for TX and RX descriptor memories. The corresponding high and low addresses of this region, and the identifier for the relevant agent will be programmed into a set of MAM registers. The device driver will also be initialized to mask TX and RX interrupts from the device and enable all of the other interrupts from the device. This prevents an interrupts from the device and enable all of the other interrupts from the being sent to the CPU. The operation of the MAM to process the interrupts in this embodiment is shown in FIG. 7.

When the MAM detects an update to the RX or TX descriptor memories at 80, it will update the corresponding bit in the MAM ISR at 82. The MAM then generates the interrupt signal to the CPU at 84, which is why the interrupts to the CPU directly from the device are masked, or disabled.

The CPU then reads the MAM ISR at 86 to determine the device that has caused the MAM to generate the interrupt and then clears that bit in the MAM ISR and processes the descriptor at 88. For example, processing an RX descriptor may involve the CPU tasking a network device to access the received packet identified by the RX descriptor and determine that packet's next hop.

This embodiment of the invention does not involve any ISR reads across the expansion bus for normal event processing. In the above example, the normal event was assumed to be reception or transmission of a packet. There is no limitation to this particular application, and any device could be initialized to follow this scheme for normal events. For extraordinary events, the interrupt signals would not be masked and processing would continue as currently implemented.

Thus, although there has been described to this point a particular embodiment for a method and apparatus for improved interrupt efficiency across expansion busses, it is not intended that such specific references be considered as limitations upon the scope of this invention except in-so-far as set forth in the following claims.

What is claimed is:

1. A method of processing interrupts, the method comprising:
   detecting an indicator of an interrupt signal from an expansion device residing on an expansion bus, wherein the detecting occurs at a local device on a local bus;
   transferring data related to the interrupt signal from the device across the expansion bus to a local memory and updating a memory access monitor bit in a memory access monitor status register; and
   processing the data related to the interrupt signal.

2. The method of claim 1, detecting an indicator of an interrupt further comprising receiving an interrupt at a central processor.

3. The method of claim 1, detecting an indicator of an interrupt further comprising receiving an interrupt on an interrupt line to a direct memory access controller.

4. The method of claim 1, detecting an indicator of an interrupt further comprising using a direct memory access controller to detect a voltage change on an interrupt line.

5. The method of claim 1, transferring data further comprising using a direct memory access controller to transfer data from any expansion devices that generated interrupt signals.

6. The method of claim 1, transferring data further comprising using a direct memory access controller to transfer data from expansion device to local memory and generating an interrupt to a central processor.

7. A method of processing interrupts, the method comprising:
   detecting interrupt signals at a processor;
   determining if the interrupt signals are from local devices or expansion devices that reside on an expansion bus;
   directing a direct memory access controller residing on a local bus with the processor to read a status register for any expansion devices that have generated interrupt signals;
   processing any interrupt signals from local devices; and
   processing any interrupt signals from devices located across the expansion bus.

8. The method of claim 7, detecting interrupt signals further comprising receiving interrupt signals at a central processor.

9. The method of claim 7, determining further comprising determining that the interrupt signals are from local devices and any expansion devices further comprise no expansion devices.

10. The method of claim 7, determining further comprising determining that the interrupt signals are from expansion devices and directing a memory access controller further comprises directing a memory access controller to process a second interrupt while processing a first interrupt.

11. A method of processing interrupts, the method comprising:
    detecting an update to a descriptor memory at a direct memory access controller local to a central processor;
    updating a register corresponding to the descriptor memory in a local status register;
    generating an interrupt to the central processor;
    identifying a device generating the update; and
    performing a task associated with the descriptor memory.

12. The method of claim 11, detecting an update to a descriptor memory further comprising detecting an update to a descriptor memory using a memory access monitor.

13. The method of claim 11, performing a task further comprising transmitting a packet.

14. The method of claim 11, performing a task further comprising determining a next hop for a received packet.

15. A method of processing interrupts, the method comprising:
    detecting an interrupt at a direct memory access controller residing on a local bus with a central processor from a device located across an expansion bus from the central processor;
    transferring data from the device to a local memory residing on the local bus; and
    generating an interrupt signal to the central processor when transfer is complete.

16. The method of claim 15, detecting an interrupt further comprising receiving an interrupt on an interrupt line to a direct memory access controller.

17. The method of claim 15, detecting an interrupt further comprising using a direct memory access controller to detect a voltage change on an interrupt line.

18. A device, comprising:
    a central processor having at least one direct memory access controller local to the processor,
    an expansion bus;
    at least one expansion device in communication with the central processor through the expansion bus; and
    at least one interrupt signal line electrically coupled between the direct memory access controller and the expansion bus.

19. The device of claim 18, at least one interrupt signal line further comprising at least one interrupt signal line directly connected to the direct memory access controller.

20. The device of claim 18, at least one interrupt signal line further comprising a detection line electrically coupled between a central interrupt signal line and a direct memory access controller.

21. A device, comprising:
    a central processor having at least one direct memory access controller local to the central processor;
    an expansion bus;
    at least one expansion device in communication with the central processor through the expansion bus; and
    a memory access monitor residing on a local bus with the central processor electrically coupled to a memory to detect updates to the memory made by an expansion device.

22. The device of claim 21, the memory access monitor further to detect an update to a receive descriptor memory.

23. The device of claim 21, the memory access monitor further to detect an update to a transmission descriptor memory.

24. The device of claim 21, the memory access monitor being implemented inside a system controller.

25. The device of claim 21, the memory access monitor being implemented in software executed by a system controller.

26. A device, comprising:
    means for detecting an interrupt indicator from an expansion device on an expansion bus at a device on a local bus;
    means for transferring data related to the interrupt signal from the device to a local memory on the local bus and for updating a memory access monitor bit in a memory access monitor status register; and
    means for processing the data related to the interrupt.

27. A device, comprising:
    means for detecting interrupt signals;
    means for determining sources of the interrupt signals;
    means for directing a direct memory access controller local to a central processor to read a status register for any expansion devices that have generated interrupt signals;
    means for processing any interrupt signals from local devices; and
    processing any interrupt signals from expansion devices.

28. A device, comprising:
    means for detecting an update to a descriptor memory, the means being local to a central processor;
    means for updating a register corresponding to the descriptor memory in a local status register;
    means for interrupting the central processor;
    means for identifying a device generating the update; and
    means for performing a task associated with the update.

29. A device, comprising:
    means for detecting an interrupt at a direct memory access controller local to a central processor from an expansion device on an expansion bus;
    means for transferring data from the device to a local memory; and
    means generating an interrupt signal to the central processor when transfer is complete.

* * * * *

UNITED STATES PATENT AND TRADEMARK OFFICE
CERTIFICATE OF CORRECTION

| | | |
|---|---|---|
| PATENT NO. | : 7,073,007 B1 | |
| APPLICATION NO. | : 10/625218 | |
| DATED | : July 4, 2006 | |
| INVENTOR(S) | : Sampath Hosahally Kumar | |

It is certified that error appears in the above-identified patent and that said Letters Patent is hereby corrected as shown below:

Column 5, lines 22-23, the words "is actually implementations" should read -- is actually completed, due to the latencies in the path from the device to the local memory. In the current implementations --;

Column 5, lines 58-60, the words "This prevents an interrupts from the device and enable all of the other interrupts from the being sent to the CPU." should read -- This prevents an interrupt generated in response to the TX or RX transactions from being sent to the CPU. --.

Signed and Sealed this

Twenty-eighth Day of February, 2012

David J. Kappos
*Director of the United States Patent and Trademark Office*